United States Patent [19]

Inaba et al.

[11] Patent Number: 4,542,471
[45] Date of Patent: Sep. 17, 1985

[54] ROBOT CONTROL SYSTEM FOR PRESETTING LIMIT VALUES CORRESPONDING TO LIMITS OF DEVIATION

[75] Inventors: Hajimu Inaba; Hideo Miyashita, both of Hino, Japan

[73] Assignee: Fanuc Ltd., Tokyo, Japan

[21] Appl. No.: 334,925

[22] Filed: Dec. 28, 1981

[30] Foreign Application Priority Data

Dec. 30, 1980 [JP] Japan ................. 55-186750

[51] Int. Cl.³ ........................................ G05B 19/23
[52] U.S. Cl. ..................... 364/513; 364/185; 364/192; 318/632
[58] Field of Search ............ 364/513, 185, 190, 191, 364/192, 193, 474, 475; 318/568, 632

[56] References Cited

U.S. PATENT DOCUMENTS

| Re. 30,016 | 5/1979 | Hohn | 364/474 |
| Re. 30,132 | 10/1979 | Irie | 318/568 |
| 3,845,284 | 10/1974 | Taguchi et al. | 364/513 |
| 3,917,930 | 11/1975 | Davey et al. | 364/176 |
| 4,150,326 | 4/1979 | Engelberger et al. | 318/568 |
| 4,158,226 | 6/1979 | Struger et al. | 364/142 X |
| 4,242,621 | 12/1980 | Spaulding | 364/142 X |
| 4,251,761 | 2/1981 | Inoue | 318/632 |
| 4,347,578 | 8/1982 | Inaba | 364/513 |
| 4,356,554 | 10/1982 | Susnjara et al. | 364/513 |

FOREIGN PATENT DOCUMENTS

| 1405651 | 7/1972 | United Kingdom . |
| 1515538 | 10/1975 | United Kingdom . |
| 2004668 | 9/1978 | United Kingdom . |

Primary Examiner—Jerry Smith
Assistant Examiner—John R. Lastova
Attorney, Agent, or Firm—Staas & Halsey

[57] ABSTRACT

Disclosed is a robot control system of the type in which instructive data taught by means of a teaching box is stored in memory and a manipulator such as a robot hand is actuated in accordance with the instructive data so that the robot is made to execute predetermined tasks. The manipulator is so driven by a servo motor as to reduce to zero a deviation between the number of command pulses generated on the basis of the instructive data and the number of feedback pulses generated in accordance with the current position of the manipulator. In accordance with a feature of the invention, the limit values of the deviation are stored in memory in advance and, when the deviation is found to lie outside the range of the limit values during the operation of the robot, such condition is interpreted as an overload and the operation of the robot is halted.

4 Claims, 4 Drawing Figures

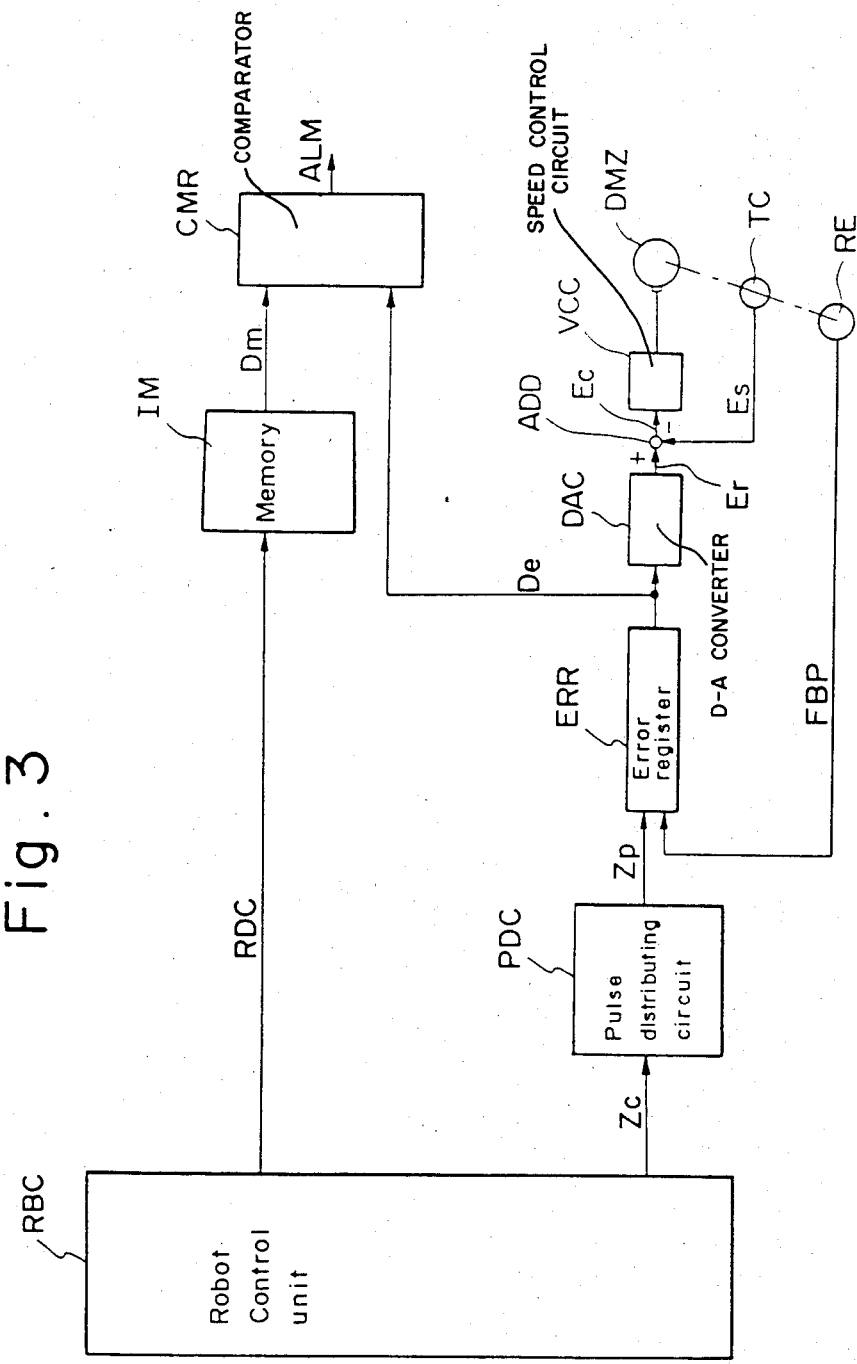

ROBOT CONTROL SYSTEM FOR PRESETTING LIMIT VALUES CORRESPONDING TO LIMITS OF DEVIATION

BACKGROUND OF THE INVENTION

This invention relates to a method and apparatus for controlling a robot and, more particularly, to a method and apparatus for assuring safe operation by halting robot motion upon sensing an abnormal condition such as an overload acting upon the robot.

The rising cost of labor in the industrialized world has given rise to a demand for labor-saving measures and for improvements in work procedures. Industrial robots have been put into use to meet this demand and have been very successful in doing so. Particularly outstanding results have been achieved in plants having numerous machine tools where industrial robots are used to perform such simple tasks as changing the workpieces and tools associated with each machine tool. The demand for such robots has grown yearly. These industrial robots have a so-called "playback" capability, in which the robots are taught their tasks or services and then caused to perform these tasks as necessary. Specifically, a teaching box is used to enter the tasks that are to be performed, these tasks constituting robot instruction data which is stored beforehand in a memory located within the associated control unit. Whenever a request for a particular service arrives from the machine tool, a series of the above robot instruction data is read out of the memory sequentially, and the robot responds to the instructions by servicing the machine tool as required.

The robot instruction data comprises positional information regarding the point at which a service is to be performed, robot operating speed, and service codes which instruct how the robot hand is to be controlled at the above-mentioned point and which instruct also the exchange of signals with the machine tool. In general, the teaching operation mentioned above proceeds in the following order: (1) establish the memory addresses of the locations at which the items of robot instruction data are to be stored; (2) position the robot arm by a jog feed operation (that is, by moving the arm manually); (3) set the positional information regarding the servicing point and set the value of the speed command; and (4) set the robot service codes. A series of robot operations related to a machine tool is taught by repeating the aforesaid steps (1) through (4). Accordingly, as long as there are no problems with the mechanism or the control system of the robot, and after the robot arm has been positioned at the predetermined operating speed, the robot will respond to the robot instruction data to execute such services as workpiece and/or tool exchange, cleaning of machining scraps, manipulation of the hand and the like.

There are cases, however, where the robot may malfunction or where an abnormality may develop in the associated peripheral equipment. When such is the case the robot may lift or grasp an extremely heavy workpiece, or it may attempt to lift a workpiece together with the associated jig, or it may press against the machine tool. It may even "miss" the workpiece and fail to grasp it, the robot hand closing upon itself. Occurrences such as these can result in damage to the robot or machine tool or both. The conventional systems have not been designed to deal adequately with the foregoing problems and therefore do not assure a suitable degree of safety.

BRIEF SUMMARY OF THE INVENTION

Accordingly, an object of the present invention is to provide a method and apparatus for robot control which enables the detection of abnormalities such as overloads, prevents machine tool and robot damage, and assures operator safety.

Another object of the present invention is to provide a method and apparatus for robot control which enable an overloaded condition to be sensed in simple fashion on the basis of a delay in a servo system, without relying upon the detection of an armature current.

These and other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a block diagram illustrating a second embodiment of an apparatus for practicing a robot control method according to the present invention.

DESCRIPTION OF THE PREFERRED EMBODIMENTS

Figure 1A:
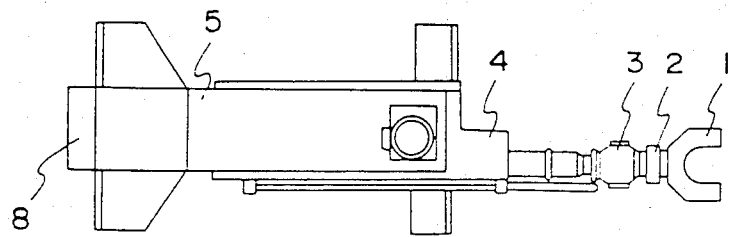
FIG. 1 shows an example of a play-back type industrial robot, in which (A) is a plan view and (B) is a side view.
Figure 1B:
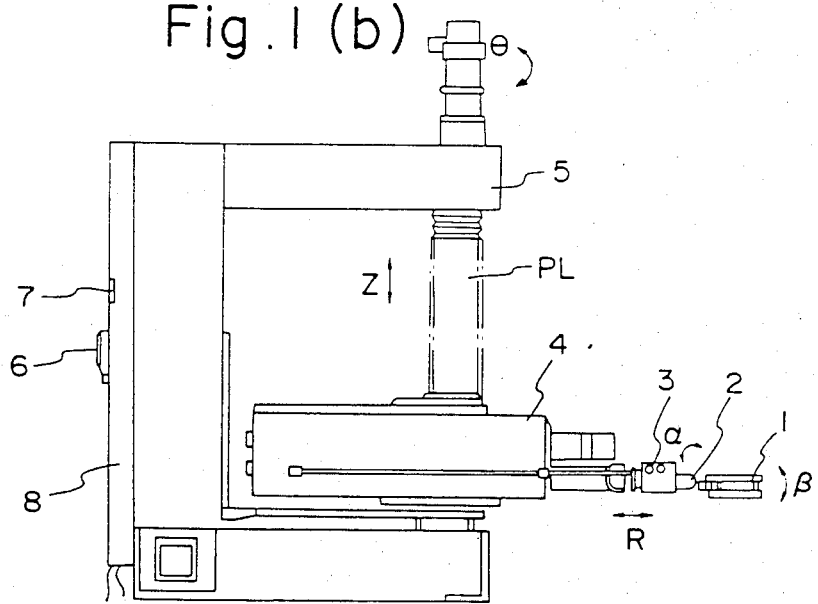

Referring first to FIG. 1, an industrial robot to which the present invention is applied comprises a mechanical hand 1 for gripping workpieces or tools that are to be exchanged, a wrist 2 capable of being twisted about the $\alpha$-axis and inclined up and down along the $\beta$-axis, an arm 3 which can be freely extended and, retracted along the R-axis, a casing 4 which can be moved vertically along the Z-axis along a shaft PL and swiveled from side to side along the $\theta$-axis on the shaft PL, a frame 5 for supporting the casing, a teaching box 6 for teaching robot motion, a control panel 7 manipulated by the operator, and a control unit 8 for storing, in succession, the data taught using the teaching box (which data will be referred to as instructive data hereinafter), such as the operating position (the point at which a particular service is to be performed), the operating speed and the various services to be performed, and for controlling the motion of the hand 1, wrist 2, arm 3 and casing 4 in accordance with the instructive data.

An apparatus for practicing a robot control method according to the first embodiment of the present invention will now be described with reference to FIG. 2. A robot control unit RBC, composed of a microcomputer, is adapted to store instructive data, a control program and other such data and to exchange signals with the machine tool in order to effect control of the robot. A pulse distributing circuit PDC receives a Z-axis movement command $Z_c$ from the robot control unit RBC and performs a pulse distributing operation on the basis of the magnitude of $Z_c$ to produce command pulses $Z_p$ the number of command pulses is a function of the magnitude of $Z_c$. The command pulses $Z_p$ are applied to an error register ERR which also receives feed back pulses FBP each of which is generated whenever a DC motor DMZ, to be described later, rotates through a predetermined angle. The error register ERR is adapted to count up or to count down, in accordance with the direction of robot movement, the command pulses $Z_p$ and the feedback pulses FBP. More specifically, assume that the robot is travelling along the Z-axis in the positive direction. In such case the content of error register ERR will be up-counted by one count each time a command pulse $Z_p$ is generated, and will be down-counted by one count each time a feedback pulse FBP is generated. Conversely, when the robot is travelling along the Z-axis in the negative direction, the content of register ERR will be down-counted by one count each time a command pulse $Z_p$ is produced, and will be up-counted by one count each time a feedback pulse FBP is produced. Thus the information stored in the error register ERR always represents the difference between the number of command pulses $Z_p$ and the number of feedback pulses FBP. The error register produces an error or deviation signal $D_e$ indicative of this difference. A digital-to-analog (DA) converter DAC receives the signal $D_e$ from the error register ERR and executes a DA conversion to produce an analog positional error voltage $E_r$ which is proportional to $D_e$, that is, to the content of the error register ERR. An adding/subtracting circuit ADD produces a differential voltage $E_c$ by computing the difference between the positional error voltage $E_r$ and an actual speed voltage $E_s$ which is proportional to the actual speed of the DC motor DMZ. A speed control circuit VCC, which receives the voltage differential $E_c$ from the adding/subtracting circuit ADD, includes such circuitry (not shown) as a phase compensating circuit, thyristor phase control circuit and thyristor circuit, and is adapted to control the motor speed in such a manner that the voltage differential $E_c$ approaches zero. Specifically, the thyristor phase control circuit advances or retards the thyristor firing phase in accordance with the magnitude of voltage differential $E_c$, thereby regulating the voltage applied to the motor to control the rotational speed of the motor. The motor DMZ referred to above is a DC motor for drive along the Z-axis and receives the regulated voltage from the speed control circuit VCC. A tachometer TC is coupled directly to the DC motor shaft and produces the actual speed voltage $E_s$ whose amplitude is proportional to the actual rotational speed of the DC motor DMZ. A sensor RE, such as a rotary encoder or resolver, generates one feedback pulse FBP each time the DC motor DMZ rotates by a predetermined angle.

MPX denotes a multiplexer which receives the deviation signal $D_e$ from the error register ERR. When the robot control unit RBC delivers a deviation teach signal DTS in the teach mode of operation, the multiplexer MPX transmits the signal $D_e$, namely the content of error register ERR, to the robot control unit RBC. On the other hand, when the control unit RBC sends a deviation check command DCS to the multiplexer MPX during a robot service run, namely in a so-called play-back mode of operation, the multiplexer responds by applying the signal $D_e$ to a comparator unit CMR which will be described below. Upon receiving the deviation signal $D_e$ from the multiplexer MPX, the robot control unit RBC processes the signal in a predetermined manner to compute its upper and lower limits $D_{max}$, $D_{min}$. The control unit stores these threshold limit values $D_{max}$, $D_{min}$ of the signal $D_e$ in a memory TCM. These values are written into predetermined addresses of the memory TCM by a write command WTC, and are read out from the predetermined addresses by a read command RDC. The commands RDC, WTC are issued by the robot control unit RBC. In the playback mode of operation the robot control unit RBC will issue the deviation check signal DCS, and the threshold limit values $D_{max}$, $D_{min}$ from the memory TCM, as well as the deviation signal $D_e$ delivered through the multiplexer MPX, will be fed into the comparator unit CMR which compares the magnitude of $D_e$ with the threshold limit values. When the magnitude of $D_e$ is found to lie outside these limit values, the comparator unit CMR generates an alarm signal ALM.

The operation of the apparatus shown in FIG. 2 will now be described. First, the robot control unit RBC is taught the required robot motions and operations in the ordinary manner. During this procedure a deviation check instruction is entered in advance by the operator at the proper place in the instructive data. This is performed by entering a robot service code which imposes the deviation check instruction on the instructive data at the location where the deviation signal $D_e$ is desired to be checked. Under these conditions the robot control unit RBC is placed in a deviation teach mode and the robot is actuated in accordance with the instructive data.

When the robot control unit RBC issues the Z-axis movement command $Z_c$, the pulse distributing circuit PDC performs a pulse distributing operation and delivers the distributed pulses $Z_p$ in the manner described above. The error register ERR counts the distributed pulses $Z_p$ up or down in accordance with the direction of robot movement, sending the resulting value to the DA converter DAC which converts this signal into the positional error voltage $E_r$. The error voltage $E_r$ is impressed upon the motor DMZ through the adding-subtracting circuit ADD and speed control circuit VCC, driving the motor DMZ into rotation. As the motor DMZ rotates, the tachometer TC produces the actual speed voltage $E_s$, and the sensor RE generates one feedback pulse FBP each time the DC motor DMZ rotates by a predetermined angle. The feedback pulses FBP enter the error register ERR which now delivers the arithmetic difference between the distributed pulses $Z_p$ and the feedback pulses. The difference, namely the deviation signal $D_e$, is converted into the positional error voltage $E_r$ in the manner described above. Next, the adding/subtracting circuit ADD computes the voltage differential $E_c$, namely the deviation from the actual speed voltage $E_s$. The voltage differential $E_c$ drives the motor DMZ into rotation, so that the robot is transported toward the target position along the Z-axis at the commanded speed. In other words, the robot, in accordance with the instructive data, is moved toward the target position and executes the predetermined task.

When the load upon the motor is constant, the content of the error register ERR, namely the arithmetic difference or deviation between the number of distributed pulses and the number of feedback pulses, is a constant value commensurate with the commanded speed (the pulse rate of the distributed pulses) under steady conditions. This deviation is proportional to the commanded speed; hence, the higher the commanded speed, the larger the deviation. Furthermore, when the commanded speed is constant, a change in the size of the load will cause the deviation to change in accordance with the load. In other words, the larger the load, the greater the deviation. Therefore, if the robot grasps a workpiece which is much heavier than a prescribed workpiece, or if it attempts to lift the associated jig along with the workpiece, or if it should come into abutting contact with a machine tool, the abovementioned deviation increases in magnitude. Accordingly, abnormal occurrences of the type just described can be detected by monitoring the magnitude of the deviation. This is the expedient adopted in the present invention.

During the course of the predetermined robot operations performed in accordance with the instructive data, the aforementioned deviation check instruction will be read from said data. When this occurs, the robot control unit RBC issues the deviation teach signal DTS, in response to which it receives the deviation $D_e$ through the multiplixer MPX. The robot control unit RBC then subjects the deviation $D_e$ to predetermined processing to find its upper and lower limits $D_{max}$, $D_{min}$, these then being stored in the memory TCM. The robot control unit can be arranged to compute these values in the following manner. Specifically, when the deviation teach signal DTS has been generated, the robot control unit may be adapted to receive the deviation $D_e$ at predetermined time intervals until the robot has moved from one point to the next, and to compute the limit values based on the average value of the deviation $D_e$ received each time, or based on the maximum value and minimum value of the deviation.

Thus, robot operations are executed in accordance with the instructive data and the limits of the deviation $D_e$ are computed concurrently.

When the deviation check instruction is read from the instructive data in the play-back mode of operation, that is, during actual control of the robot, the control unit RBC delivers the deviation check signal DCS on line $l_1$ and the read command RDC on line $l_2$. As a result, the predetermined upper and lower limit values $D_{max}$, $D_{min}$ are delivered by the memory TCM, and the deviation $D_e$ is delivered at predetermined times by the multiplexer, the values of $D_{max}$, $D_{min}$ and $D_e$ being fed into the comparator unit CMR which checks to determine whether the deviation $D_e$ is outside the range of values defined by $D_{max}$, $D_{min}$. When this is indeed the case, the comparator unit CMR issues the alarm ALM, in response to which motion of the robot is halted.

Figure 2:
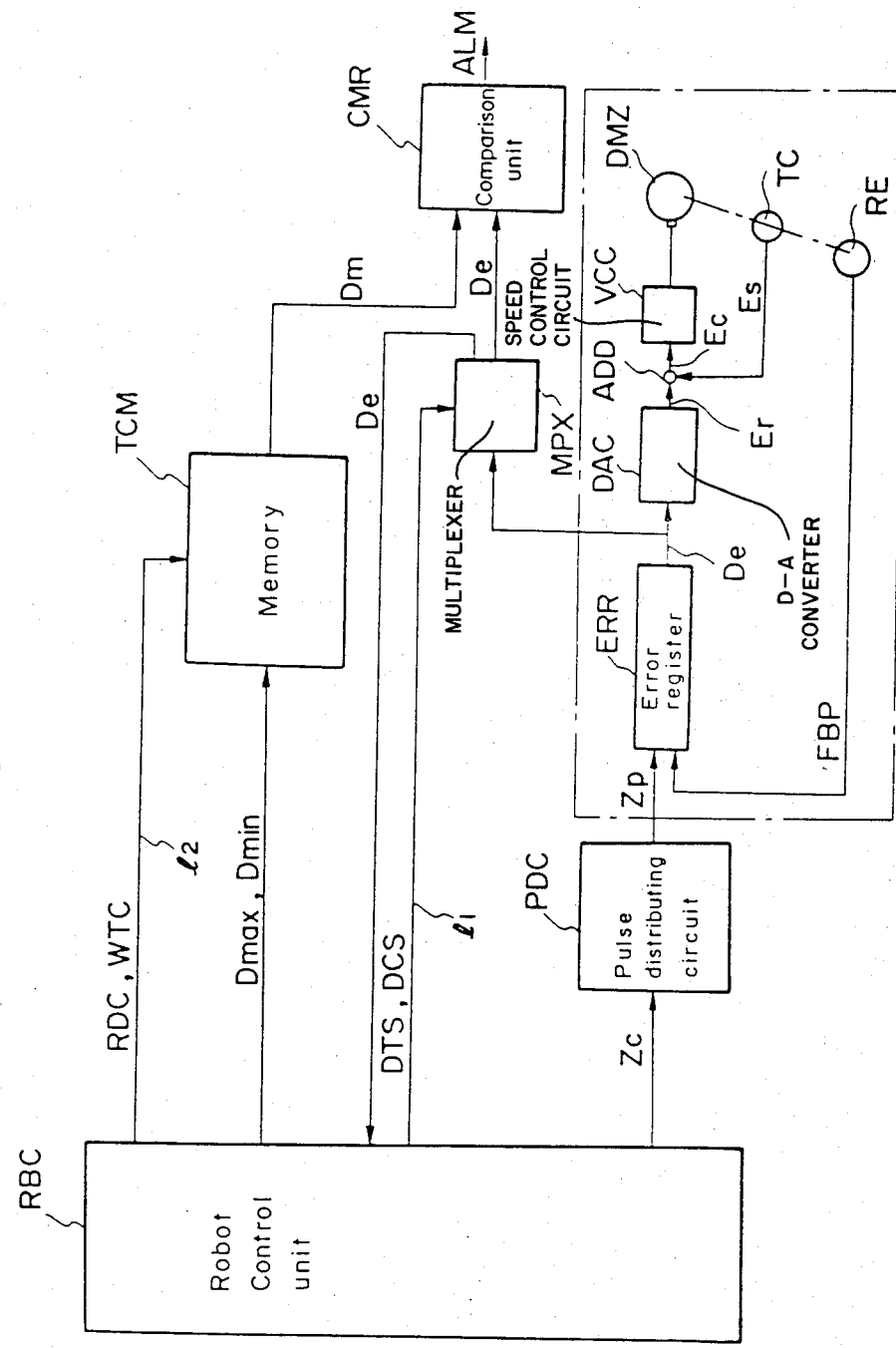
FIG. 2 is a block diagram illustrating a first embodiment of an apparatus for practicing a robot control method according to the present invention.

It should be noted that the description in conjunction with FIG. 2 relates to the Z-axis only. In practice, however, control is similarly effected for the other axes (R-axis, $\theta$-axis) as well. Furthermore, it has been described that the limit values are stored in the memory TCM. By providing a limit value arithmetic unit on the output side of the memory TCM, however, the average value of the deviation or its maximum and minimum values can be stored in the memory TCM and thence delivered to the arithmetic unit for the computation of the limit values. In the above arrangement the memory TCM, comparator unit CMR and the like have been described as being located outside of the robot control unit RBC. However, the robot control unit RBC constituted by the microcomputer can be made to perform these functions and can be made to store the limit values along with the instructive data.

In the foregoing embodiment the limit values are obtained by reading the deviation while the robot is operating in accordance with the instructive data. Described next will be an embodiment in which the deviation values are predicted in advance on the basis of the robot position, attitude and load information such as the weight of a workpiece. This permits the predicted deviation values, or the limit values obtained from the predicted deviation values, to be set beforehand.

Reference will now be had to FIG. 3 to describe this second embodiment of the present invention. Unlike the first embodiment, the arrangement is such that the upper and lower limits $D_{max}$, $D_{min}$ of the deviation, computed from the robot position and attitude and from the weight of the workpieces, are stored beforehand in a memory IM. More specifically, in the arrangement of FIG. 3, the limit values are computed in advance for each of a plurality of robot positions, the computed values are stored ahead of time in the memory IM, and a deviation check instruction is imposed, in the form of a service code, on the robot instruction data (the instructive data) which corresponds to each robot position. When the deviation check instruction is read, therefore, the predetermined limit values and the deviation $D_e$ read out of the error register ERR are applied to the comparator unit CMR for a comparison of magnitude, as already described in connection with FIG. 2. It should be noted that these limit values can be entered manually or automatically in connection with the entry of the corresponding check instructions.

The present invention as described hereinabove makes it possible to sense abnormalities, such as excessive loads, with a high degree of accuracy, and to prevent robot malfunctions as well as damage to the robot and machine tools. The invention also enhances operator safety.

As many apparently widely different embodiments of the present invention can be made without departing from the spirit and scope thereof, it is to be understood that the invention is not limited to the specific embodiments thereof except as defined in the appended claims.

What is claimed is:

1. A method for controlling a robot of the type in which a deviation between a number of command pulses generated in accordance with predetermined instructive data stored in a memory and a number of feedback pulses generated in accordance with the movement of the robot, is stored in an error register and the robot is driven in such a manner that the deviation approaches zero, said method comprising the steps of:
   presetting limit values corresponding to limits of the deviation by-
      operating the robot on the basis of the predetermined instructive data;
      reading said deviation out of the error register while the robot is operating in accordance with the predetermined instructive data;
      computing the limit values using said deviation read out of the error register;
      storing said limit values in the memory;
   reading a deviation check instruction included in said predetermined instructive data, during operation of the robot;
   comparing, in accordance with said deviation check instruction, said deviation with the limit values; and
   halting the operation of the robot when said deviation is outside the range of said limit values, such condition being interpreted as an overload.

2. The robot control method according to claim 1, in which the deviation stored in the error register is predicted from such information as the robot position, attitude and workpiece weight, the preset limit values being derived in accordance with the predicted deviation.

3. A robot control apparatus for controlling a robot of the type in which a deviation between a number of command pulses generated in accordance with predetermined instructive data, including a deviation check instruction, and in accordance with a number of feedback pulses generated in accordance with the movement of the robot, is stored in an error register and the robot is driven in such a manner that the deviation approaches zero, said apparatus comprising:

means for operating the robot in accordance with the predetermined instructive data;

means for reading the deviation out of the error register while the robot is operating in accordance with the predetermined instructive data;

means for computing the limit values in accordance with a deviation read out of the error register;

a memory for storing the limit values corresponding to limits of the deviation;

means for reading the deviation during the operation of the robot, in response to the deviation check instruction being read;

means for comparing the deviation with the limit value, in response to the deviation check instruction being read;

means for halting the movemet of the robot when the deviation is found to be outside the range of the limit values.

4. The robot control apparatus according to claim 3, further comprising:

means for predicting the deviation stored in the error register from such information as the robot position, attitude and workpiece weight, and means for deriving the limit values in accordance with the predicted deviation.

* * * * *